Jan. 3, 1956 A. E. McFARLAND ET AL 2,729,105
SAMPLE TAKING APPARATUS
Filed Aug. 7, 1953 2 Sheets-Sheet 2
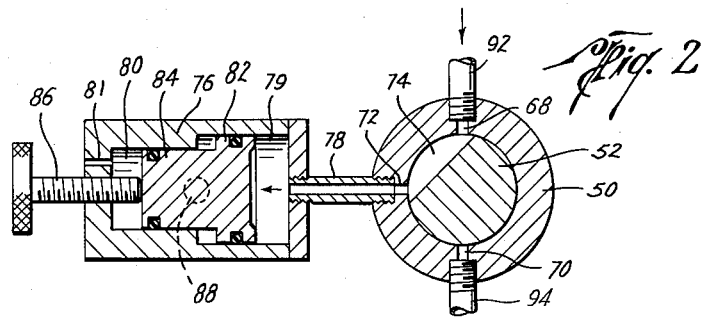
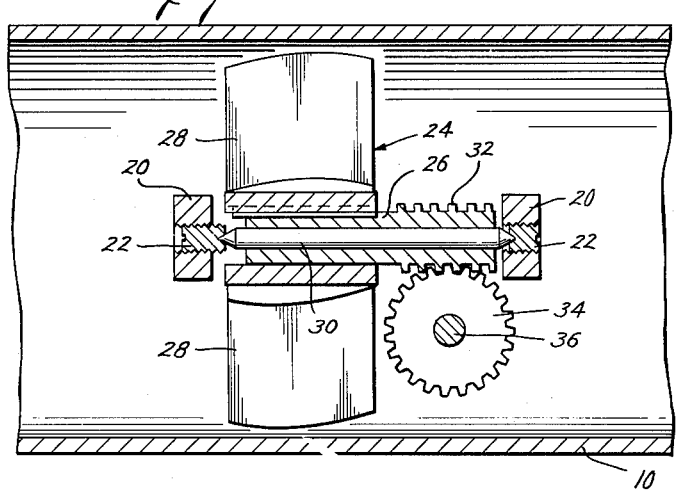
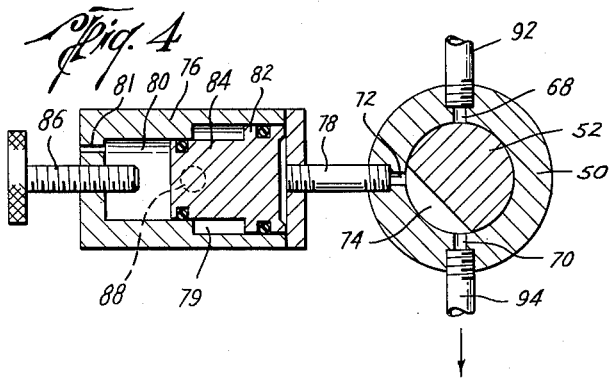
Arthur E. McFarland
Artie F. McFarland
INVENTORS
BY Charles E. Lightfoot
ATTORNEY

United States Patent Office 2,729,105
Patented Jan. 3, 1956

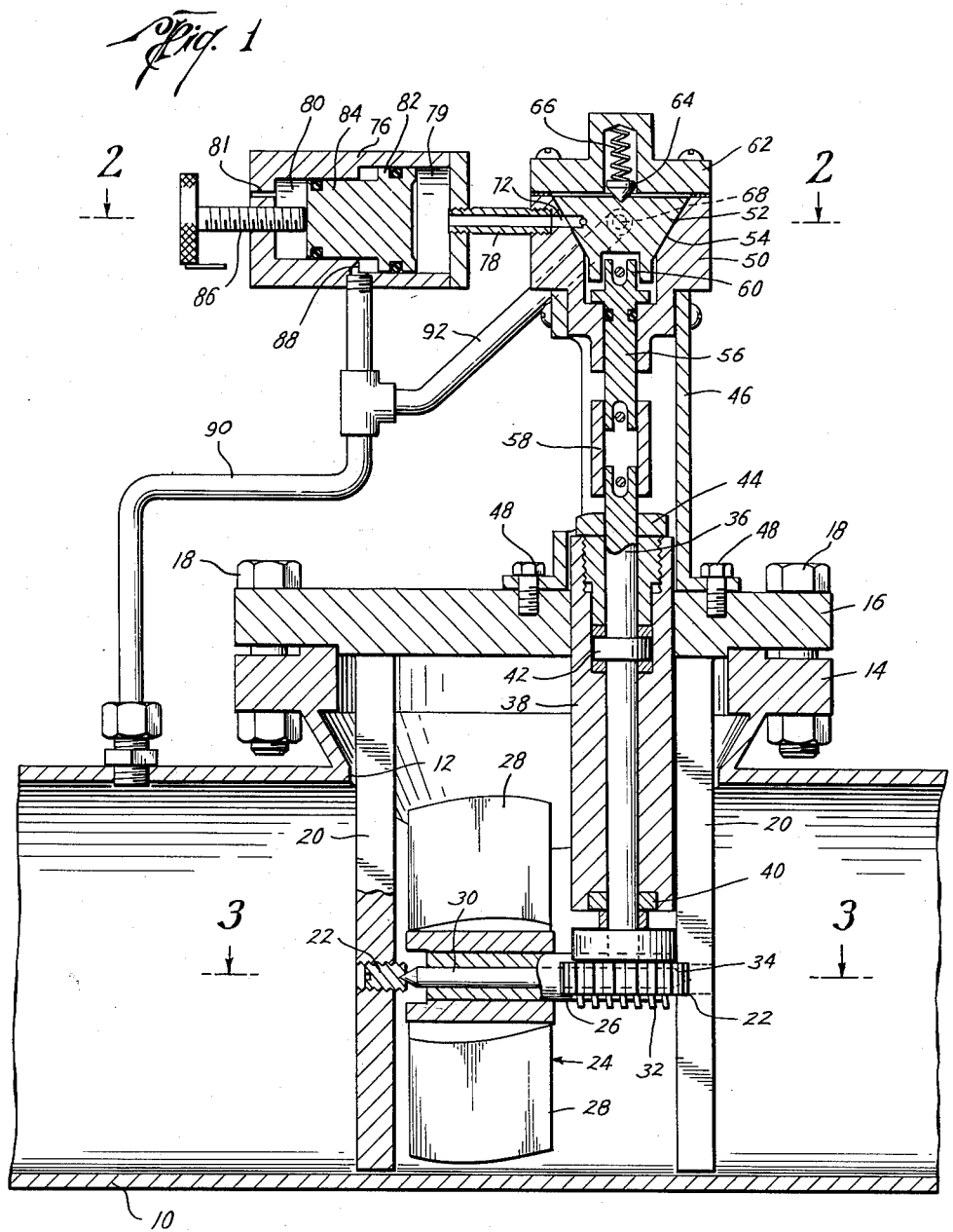

2,729,105
SAMPLE TAKING APPARATUS

Arthur E. McFarland and Artie F. McFarland, Houston, Tex.

Application August 7, 1953, Serial No. 372,846

7 Claims. (Cl. 73—422)

This invention relates to sample taking apparatus and more particularly to mechanism for taking samples of liquid from a conduit through which the liquid is flowing.

The invention has for an important object the provision of a sample taking device adapted to be applied to a conduit through which liquid flows and which is operated entirely by the flow of liquid through the conduit to remove samples of the liquid from the conduit at short intervals for the purpose of keeping a close check on the quality of the liquid.

Another object of the invention is to provide apparatus for taking samples from a flowing liquid whereby the proportion of the sample to the amount of liquid flowing may be accurately controlled as well as the amount of each sample withdrawn.

A further object of the invention is the provision of a sample taking apparatus which is adapted to be mounted on a conduit through which flows a liquid to be sampled and which includes means operable by the flow of the liquid for controlling the withdrawal of samples of the liquid in accordance with the amount of liquid flowing through the conduit.

A still further object of the invention is to provide sample taking apparatus of the kind referred to which is of simple design and rugged construction and which is capable of continuous operation to withdraw portions of liquid at regular intervals from the conduit through which the liquid flows.

The above and other important objects and advantages of the invention will best be understood from the following detailed description, constituting a specification of the same, when considered in conjunction with the annexed drawings, wherein:

Figure 1 is a side elevational view, partly broken away and partly in cross-section illustrating a preferred embodiment of the invention;

Figure 2 is a cross-sectional view taken along the line 2—2 of Figure 1, looking in the direction of the arrows;

Figure 3 is a cross-sectional view, taken along the line 3—3 of Figure 1, looking in the direction indicated by the arrows; and Figure 4 is a view similar to that of Figure 2 showing the relative positions of the parts at a somewhat different stage of the operation of the device.

Referring now to the drawings in greater detail the invention is shown in its application to a liquid flow line, such as an oil pipe line or conduit 10, of conventional construction, and in which an opening 12 is provided, leading from the interior of the conduit and which is surrounded by an external annular flange 14. The invention includes a closure 16 of suitable design which fits on the flange 14 and may be secured thereto by suitable fastening means, such as the bolts 18 which extend through registering perforations in the flange and closure. Spaced, parallel supports or lugs 20, 20 extend downwardly from the closure within the interior of the conduit, and are provided within the conduit with suitable bearing means such as the adjustable plugs or bushings 22, 22, arranged in longitudinally aligned relation and externally threaded to be received in internally threaded openings in the supports.

Rotatably mounted between the bearings 22, within the conduit, there is a driving element or rotor 24, which may conveniently be formed with a central tubular hub 26 provided with radially extending, suitably curved vanes 28, which hub is rotatably supported on a shaft 30, journalled at its opposite ends in the bearings 22. The hub 26 extends beyond one side of the rotor, and is provided at its outer end portion with a worm 32, which meshes with a gear 34, carried on the lower end of a driving shaft 36. The driving shaft 36 extends upwardly through a housing 38, carried by the closure 16 and extending therethrough, suitable bearing means, such as that indicated at 40, being provided within the lower end of the housing, and the housing also having a conventional stuffing box at its upper end, within which an external flange 42 on the shaft is disposed, there being suitable packing above and below the flange, which is retained in position by a screw plug 44 closing the stuffing box.

It will be apparent that liquid flowing through the conduit 10 will cause the rotor 28 to rotate, thus turning the screw 32 and actuating the drive shaft 36, which will be rotated in accordance with the flow of liquids through the conduit.

A support 46 extends above the closure 16, and is secured thereto in any suitable manner as by means of the bolts 48, and on the upper end of this support a valve casing 50 is positioned, within which a valve 52 is rotatably carried. The valve casing is preferably formed with an internal tapering seat 54, and the valve 52 is tapered to fit the valve seat. An extension 56 is provided on the drive shaft 36, connected thereto by a suitable coupling 58, designed to permit relative longitudinal movement between the shaft and the extension, the extension extending upwardly through the valve casing, and being connected at its upper end to the valve in any suitable manner, as by means of a lost motion connection 60 whereby the valve will be rotated with the drive shaft.

The valve housing is closed at its upper end by a bonnet 62 within which a movable element 64 is carried, which is urged downwardly into contact with the upper surface of the valve 52, by means of a resilient element such as the coil spring 66, whereby the valve will be urged into fluid tight engagement with the valve seat.

The valve casing has an inlet port 68, and an outlet port 70, and also has a port 72, which is connected in communication with mechanism by which the amount of the sample withdrawn may be regulated. A passageway 74 is provided in the valve 52, by cutting away a portion of the valve body, which passageway is adapted to be brought into one position to establish communication between the ports 68 and 72 and to close off the port 70, and to another position, in which the port 70 is in communication with port 72, and the port 68 is closed off.

The mechanism by which the amount of the sample taken is regulated comprises a casing 76, having a chamber 79, whose outer end is connected in communication with the port 72 by a pipe 78, and whose inner end opens into a counterbore 80 within the casing. A piston 82 is movably mounted in the chamber 79 and has an extension 84, which works in the counterbore 80, and an adjusting screw 86 extends through the casing into the counterbore 80 for engagement with the extension 84, whereby the distance which the piston may move in the chamber is regulated. This casing 76 has a port 88, leading into the chamber 79, through which fluid may enter the chamber to cause the piston to move toward the outer end of the chamber 79, and a pipe 90 is connected in communication with this port, and with the interior of the conduit 10, whereby liquid may flow from the conduit into the chamber to move the piston forwardly. A branch pipe 92 is also provided, which connects the pipe 90 in communication with the inlet port 68 of the valve 80. An opening 81 is provided in the casing 76 which communicates with the counterbore 80 and leads to the exterior of the casing, whereby air may flow into and out of the counterbore in acordance with the movements of the extension 84 in the counterbore.

The discharge port 70 may have a discharge pipe 94 connected in communication therewith, which leads to any convenient location where it may be desired to collect the samples of liquid which are withdrawn from the conduit.

In the operation of the invention liquid flowing through the conduit 10 will cause the rotor 24 to rotate, operating the worm 32 to rotate the gear 34 and drive the drive shaft 36, which in turn rotates the valve 52 in the valve casing. When the valve reaches the position shown in Fig. 2 liquid may flow from the conduit 10 through the pipe 90 and branch pipe 92 to the inlet port 68, and, by way of the passageway 74, to port 72, through pipe 78 into the chamber 79, to move the piston 82 to the left, as seen in Fig. 2, until the extension 84 engages the adjusting screw 86. During such movement of the piston liquid may flow out of the port 88 through pipe 90 and branch pipe 92, to permit the piston to move toward the left, and such movement may take place because of the smaller area exposed to liquid on the side of the piston from which the extension 84 extends. As the valve 52 continues to rotate, communication between the ports 68 and 72 will be cut off, and when the valve reaches the position illustrated in Fig. 4 communication will be established through the passageway 74 between the port 72 and the discharged port 70, whereupon liquid from the conduit 10 will flow through pipe 90 and port 88 into chamber 79 to move the piston to the right, as seen in Fig. 4, thereby discharging the sample of liquid, through the pipe 78, port 72, passageway 74, port 70 and discharge pipe 94, to the point of collection. In this manner successive samples of liquid may be taken as the liquid flows through the conduit, thus enabling a constant check to be maintained on the quality of the liquid. By suitably adjusting the screw 86, the movement of the piston 82 in chamber 79 may be regulated to vary the size of the sample which is taken, as may be desired.

It will thus be seen that the invention, constructed as described above, provides sample taking apparatus of simple design, which may readily be applied to existing pipe line structures, which requires no independent source of power for operation, and in which the parts are easily replaceable for purposes of maintenance and repair.

The invention has been disclosed herein in connection with a certain specific embodiment of the same, but it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secured by Letters Patent is:

1. Sample taking apparatus comprising a valve casing having an inlet and an outlet and a port spaced from said inlet and outlet, a valve in the casing having a flowway and rotatable to one position to bring the flowway into communication with the inlet and said port and to another position to bring the flowway in communication with the outlet and said port, means having a connection with a conduit containing a flowing liquid and with said inlet to conduct liquid from the conduit to said inlet, and rotatable means mounted in the conduit in position to be rotated by said flowing liquid and having a driving connection with said valve to rotate the valve.

2. Sample taking apparatus comprising a valve casing having an inlet and an outlet and a port spaced from the inlet and outlet, a valve in the casing having a flowway and rotatable to one position to bring the flowway into communication with the inlet and said port and to another position to bring the outlet into communication with said port, means in communication with said port to receive liquid from said inlet when said valve is in said one position and to discharge said liquid through said outlet when said valve is in said other position, means having a connection with a conduit containing a flowing liquid and with said inlet to conduct liquid from the conduit to the inlet, and rotatable means mounted in the conduit in position to be rotated by said flowing liquid and having a driving connection with said valve to rotate the valve.

3. Sample taking apparatus comprising a valve casing having an inlet and an outlet and a port spaced from the inlet and outlet, a valve in the casing having a flowway and movable to one position to bring the flowway into communication with the inlet and said port and to another position to bring the flowway into communication with the outlet and said port, means having a connection with a conduit containing a flowing liquid and with said inlet to conduct liquid from the conduit to said inlet, a housing having a chamber and an opening in communication with the chamber, means connected in communication with the chamber through said opening and with said port and through which liquid may flow into and out of the chamber, said chamber having an inlet spaced longitudinally of the chamber from said opening, means connected in communication with said chamber inlet and said conduit and means in the chamber located between said opening and said chamber inlet and movable toward said opening in response to the flow of liquid into the chamber through said chamber inlet and away from said opening in response to the flow of liquid into said chamber through said opening.

4. Sample taking apparatus comprising a valve casing having an inlet and an outlet and a port spaced from the inlet and outlet, a valve in the casing having a flowway and movable to one position to bring the flowway into communication with the inlet and said port and to another position to bring the outlet into communication with said port, means having a connection with a conduit containing a flowing liquid and with said inlet to conduct liquid from the conduit to said inlet, a housing having a chamber and an opening in communication with the chamber, means connected in communication with the chamber through said opening and with said port and through which liquid may flow into and out of the chamber, said chamber having an inlet spaced longitudinally of the chamber from said opening, means connected in communication with said chamber inlet and said conduit, piston means in the chamber located between said opening and said chamber inlet and movable toward and away from said opening.

5. Sample taking apparatus comprising a valve casing having an inlet and an outlet and a port spaced from the inlet and outlet, a valve in the casing having a flowway and movable to one position to bring the flowway into communication with the inlet and said port and to another position to bring the outlet into communication with said port, means having a connection with a conduit containing a flowing liquid and with said inlet to conduct liquid from the conduit to said inlet, a housing having a chamber and a piston movable in the chamber, said housing having an opening on each side of said piston in communication with the chamber, means connected in communication with one of said openings and with said inlet, and means connected in communication with the other of said openings and with said port and said conduit.

6. Sample taking apparatus comprising a valve casing having an inlet and an outlet and a port spaced from the inlet and outlet, a valve in the casing having a flowway and movable to one position to bring the flowway into communication with the inlet and said port and to another position to bring the flowway into communication with the outlet and said port, means having a connection with a conduit containing a flowing liquid and with said inlet to conduct liquid from the conduit to said inlet, a housing having a chamber and a piston movable in the chamber, said housing having an opening on each side of the piston in communication with said chamber, means connected in communication with one of said openings and with said port, means connected in communication with the other of said openings and with said inlet and said conduit, and adjustable means on the casing engageable with the piston to limit movement of the piston away from said one of said openings.

7. Sample taking apparatus comprising a valve casing having an inlet and an outlet and a port spaced from the inlet and outlet, a valve in the casing having a flowway and movable to one position to bring the flowway into communication with the inlet and said port and to another position to bring the flowway into communication with the outlet and said port, a housing having a chamber and a piston movable in the chamber, means connected in communication with said chamber at one side of said piston and connecting the chamber in communication with said port, means connected in communication with the chamber at the other side of said piston and connecting the chamber in communication with said inlet and with a source of liquid to be sampled.

References Cited in the file of this patent

UNITED STATES PATENTS

| | | |
|---|---|---|
| 739,269 | Tilden | Sept. 15, 1903 |
| 1,964,270 | Nidever | June 26, 1934 |
| 2,418,876 | Grace | Apr. 15, 1947 |